United States Patent
Abad et al.

(10) Patent No.: US 8,826,954 B2
(45) Date of Patent: Sep. 9, 2014

(54) SEALING DEVICE AND PROCESS FOR PLACING SAID DEVICE ON A RIM

(75) Inventors: Vincent Abad, Chamalieres (FR); Patrick Bernadot, Romagnat (FR); Emmanuel Custodero, Chamalieres (FR)

(73) Assignees: Michelin Recherche et Technigue S.A., Granges-Paccot (CH); Compagnie General des Etablissements Michelin, Clemont-Ferrand (FR)

( * ) Notice: Subject to any disclaimer, the term of this patent is extended or adjusted under 35 U.S.C. 154(b) by 729 days.

(21) Appl. No.: 13/002,947

(22) PCT Filed: Jul. 10, 2009

(86) PCT No.: PCT/EP2009/005005
§ 371 (c)(1),
(2), (4) Date: Apr. 11, 2011

(87) PCT Pub. No.: WO2010/003679
PCT Pub. Date: Jan. 14, 2010

(65) Prior Publication Data
US 2011/0181100 A1    Jul. 28, 2011

(30) Foreign Application Priority Data
Jul. 11, 2008 (FR) .................... 08 54754

(51) Int. Cl.
| B60C 17/00 | (2006.01) |
| B60B 21/12 | (2006.01) |
| F16J 15/10 | (2006.01) |
| B60B 21/04 | (2006.01) |
| C08L 23/20 | (2006.01) |
| B60B 5/02 | (2006.01) |
| B60B 1/04 | (2006.01) |
| B60B 21/06 | (2006.01) |
| C08L 53/00 | (2006.01) |

(52) U.S. Cl.
CPC .............. *B60B 21/062* (2013.01); *B60B 21/04* (2013.01); *C08L 23/20* (2013.01); *B60B 5/02* (2013.01); *B60B 1/043* (2013.01); *B60B 1/041* (2013.01); *C08L 53/00* (2013.01); *B60B 21/12* (2013.01)
USPC ................... 152/381.6; 301/95.101; 277/650

(58) Field of Classification Search
USPC ............. 152/381.6, 417, 516, 510, 520, 514, 152/517, 504, 505
See application file for complete search history.

(56) References Cited

U.S. PATENT DOCUMENTS 4,057,090 A  * 11/1977 Hoshikawa et al. .......... 152/504
4,359,078 A  * 11/1982 Egan ............................ 152/504

(Continued)

FOREIGN PATENT DOCUMENTS

| EP | 1 674 542 | 6/2006 |
| FR | 2 910 382 | 6/2008 |

(Continued)

*Primary Examiner* — Glenn Dayoan
*Assistant Examiner* — Sunsurraye Westbrook
(74) *Attorney, Agent, or Firm* — Cozen O'Connor

(57) ABSTRACT

A sealing device forming an annular band intended to be associated with a rim for a wheel designed to accept a tire, the rim having a rim bottom extended by two flanges, the device being adapted to be fitted in such a way as to cover at least the rim bottom. The annular band comprises at least one elastomeric material comprising at least one copolymer thermoplastic elastomer containing blocks of polystyrene and polyisobutylene, and a polybutene oil. Also disclosed is a mounted assembly having a wheel comprising a rim associated with a sealing device and of a tubeless tire. In addition, a method is disclosed for fitting a sealing device onto a rim.

15 Claims, 1 Drawing Sheet

(56) References Cited

U.S. PATENT DOCUMENTS

| | | | | |
|---|---|---|---|---|
| 4,895,610 | A | * | 1/1990 | Egan .............................. 156/115 |
| 4,928,741 | A | * | 5/1990 | Rye et al. ....................... 152/504 |
| 5,443,104 | A | * | 8/1995 | Dollinger et al. .............. 152/510 |
| 5,618,882 | A | * | 4/1997 | Hammond et al. ......... 525/92 D |
| 6,402,867 | B1 | * | 6/2002 | Kaido et al. ................... 156/123 |
| 6,837,287 | B2 | * | 1/2005 | Smith, Sr. et al. ............ 152/503 |
| 2004/0031550 | A1 | | 2/2004 | Kanenari |

FOREIGN PATENT DOCUMENTS

| | | |
|---|---|---|
| FR | 2 910 478 | 6/2008 |
| WO | WO 2005/017013 | 2/2005 |

* cited by examiner

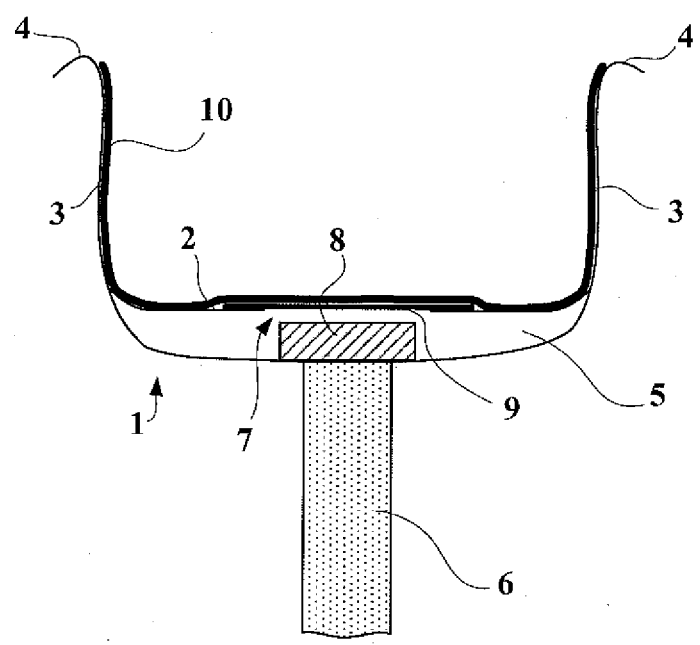

SEALING DEVICE AND PROCESS FOR PLACING SAID DEVICE ON A RIM

RELATED APPLICATION

This is a U.S. National Phase Application under 35 USC 371 of International Application PCT/EP2009/005005, filed on Jul. 10, 2009.

This application claims the priority of French patent application Ser. No. 08/54754 filed Jul. 11, 2008, the entire content of which is hereby incorporated by reference.

FIELD OF THE INVENTION

The invention relates to a sealing device for a rim designed to accept a tire that is to operate without an inner tube, that is to say a tire of the "tubeless" type and to a method for fitting the sealing device onto the rim. The invention is also aimed at a mounted assembly consisting of a wheel comprising such a rim associated with the sealing device and of a tubeless tire.

BACKGROUND OF THE INVENTION

The invention is more particularly aimed at a rim that is not airtight, originally designed to accept a tire intended to be mounted with an inner tube, and that is to be rendered airtight so that it can accept a tire of the "tubeless" type (fitted without an inner tube). However, the invention is also applicable to an airtight rim onto which there is a desire to fit, for example, a tire that has a lower region that is not very or not at all airtight.

Although not restricted to this type of application, the invention will be described more specifically with reference to a rim that is not airtight for a spoked bicycle wheel.

Bicycle wheels usually consist of a rim connected to a hub by spokes. These spokes are fixed to the rim by tightening nuts, these nuts being accessible from the radially exterior surface of the rim so that the spoke tension can be adjusted. The rim therefore has orifices distributed about its periphery to secure the tops of the spokes which, once in place, do not seal the said orifices.

When the wheel is intended to be associated with a tire and an inner tube, the lack of airtightness of the radially exterior surface of the rim does not present any problem when riding in a non-degraded mode. The presence of the tops of the spokes or of the tightening nuts does, however, entail the presence of a tape in the bottom of the rim in order to protect the inner tube from friction; if this tape were not present, the tops of the spokes or the nuts could tear the inner tube.

It is also known practice to produce mounted assemblies of the tubeless type for bicycles. Patent application EP 0 893 280 has already described a rim of the tubeless type. This type of rim allows set-ups of the tubeless type which have various advantages: first, they make it possible to dispense with the need for an inner tube, leading to cost savings, weight savings and ease of assembly. Furthermore, the absence of an inner tube allows the mounted assembly to be made less sensitive to tires that go flat as a result of nipping or puncturing.

By contrast, the costs of manufacture of such rims are far higher, which means that their circulation is not widespread.

Intermediate solutions have been developed to enable mounted assemblies of the tubeless type to be produced at a lower cost. Such solutions have, for example, been described in documents U.S. Pat. No. 4,108,232 and US 2005/0189813. Those documents describe sealing devices designed to be installed by hand and which consist in an annular band (or "flap") which is housed in the bottom of a rim and thus seals the said rim. Such devices are inexpensive and can therefore allow a bike mounted assembly of the tubeless type to be produced using rims of the "standard tube" type, which are therefore more cost-effective than the tubeless rims mentioned above.

By contrast, it has been found that the various existing devices are tricky to fit notably because of the complex centering required which could lead to imperfect airtightness. Even in the hands of an experienced user, these solutions designed for converting a standard tubed rim into a tubeless rim remain very tricky to perform and are therefore used only very infrequently. Furthermore, the properties of these annular bands and particularly their rigidity lead, even if the user has managed to fit them, to microleaks if the surface finish of the rims has even the slightest relief such as welds or other roughnesses.

According to the invention, "axial" means a direction parallel to the axis of rotation of the rim, and "radial" means a direction intersecting the axis of rotation of the rim and perpendicular to that axis. The axis of rotation of the rim is the axis about which the rim turns in normal use. The circumferential median plane is a plane perpendicular to the axis of rotation of the rim and which divides the rim into two halves. A plane that is said to be radial or meridian is a plane that contains the axis of rotation of the rim.

SUMMARY OF THE INVENTION

One object of the invention is to provide a rim, notably for a wheel that is not airtight, that can be combined with a tire of the tubeless type to form a mounted assembly that has no inner tube, the cost of which is modest and production of which is simple to perform.

This object has been achieved according to one aspect of the invention directed to a sealing device forming an annular band intended to be associated with a rim for a wheel designed to accept a tire, the said rim consisting of a rim bottom extended by two flanges, which may include gutters, the said device being intended to be fitted in such a way as to cover at least the rim bottom, the annular band comprising at least one layer of an elastomeric material comprising at least one copolymer thermoplastic elastomer containing blocks of polystyrene and polyisobutylene (hereinafter also known as "block copolymer" or "block elastomer") and a polybutene oil.

Such a block copolymer has the major advantage, owing to its thermoplastic nature, that it can be worked as such in the molten (liquid) state and therefore offers the possibility of simplified use, while the addition of the polybutene oil lowers the modulus and increases the tack without significantly degrading the sealing properties.

In this description, unless expressly indicated otherwise, all the percentages (%) given are weight percentages.

Furthermore, any range of values introduced by the expression "between a and b" represents the range of values extending from more than a to less than b (that is to say excluding the end points a and b), while any range of values introduced by the expression "from a to b" means the range of values extending from a up to b (that is to say inclusive of the strict end points a and b).

A copolymer thermoplastic elastomer based on blocks of polystyrene and polyisobutylene (or, hereafter, "block copolymer" or "block elastomer") is to be understood to mean any thermoplastic copolymer containing at least one polystyrene block (that is to say one or more polystyrene blocks) and at least one polyisobutylene block (that is to say one or more polyisobutylene blocks), with which other blocks (for example polyethylene and/or polypropylene) and/or other monomer units (for example unsaturated units such as diene units) may or may not be associated.

For preference, such a block copolymer is a stirene/isobutylene/stirene three-block copolymer ("SIBS" for short).

An SIBS elastomer or copolymer is to be understood in this application to mean, by definition, any stirene/isobutylene/stirene three-block elastomer in which the polyisobutylene central block may or may not be interrupted by one or more unsaturated units, particularly one or more diene units such as isoprene units, possibly halogenated ones.

The block elastomer such as SIBS hereinabove forms part, as is known, of the family of thermoplastic elastomers ("TPE" for short), more specifically of stirene-based thermoplastic elastomers ("TPS") for short).

It will be recalled that TPS elastomers are generally in the form of stirene-based block copolymers. Being, in structure, somewhere between a thermoplastic polymer and an elastomer, they are made up of rigid polystyrene sequences connected by flexible elastomer sequences, for example polybutadiene, polyisoprene, poly(ethylene/butylene) sequences or even polyisobutylene sequences in the case, for example, of the block elastomer such as SIBS. These are often three-block elastomers with two rigid segments connected by one flexible segment. The rigid and flexible segments may be arranged in a line, in a star or in branched configuration. Typically, each of these segments or blocks contains at least more than 5, generally more than 10 base units (for example stirene and isobutylene units in the case of SIBS).

According to one preferred embodiment of the invention, the weight content of stirene in a block copolymer such as SIBS, ranges between 5% and 50%. Below the indicated minimum, the thermoplastic nature of the block elastomer runs the risk of diminishing appreciably whereas above the recommended maximum, the elasticity of the airtight layer may be adversely affected. For these reasons, the stirene content more preferably ranges between 10 and 40%, particularly between 10 and 30%.

The term stirene is to be understood in this description to mean any stirene-based monomer, unsubstituted or substituted; examples of substituted stirene may for example include methylstirenes (for example α-methylstirene, β-methylstirene, p-methylstirene, tert-butylstirene), chlorostirenes (for example monochlorostirene, dichlorostirene).

It is preferable for the glass transition temperature (Tg, measured in accordance with ASTM D3418) of the block elastomer to be below $-20°$ C., more preferably below $-40°$ C. A Tg value above these minima may diminish the performance of the airtight layer in use at very low temperatures; for such uses, the Tg of the block elastomer is more preferably still below $-50°$ C.

The number-average molecular weight (denoted Mn) of the block elastomer preferably ranges between 30 000 and 500 000 g/mol, more preferably ranges between 40 000 and 400 000 g/mol. Below the indicated minima, the cohesion between the block elastomer chains, notably as a result of its dilution in the polybutene extension oil, runs the risk of being adversely affected; further, an increase in the operating temperature carries the risk of adversely affecting the mechanical properties, notably the rupture properties, leading to reduced "hot" performance. Moreover, too high an Mn may be detrimental to the flexibility of the gastight layer. Thus, it has been found that a value comprised in a range from 50 000 to 300 000 g/mol was particularly well suited, notably to use of the composition in a tire tread.

The number-average molecular weight (Mn) of the block elastomer is determined in the known way, by steric exclusion chromatography (SEC). The test specimen is dissolved beforehand in tetrahydrofuran at a concentration of about 1 g/l, then the solution is filtered on a porosity 0.45 μm filter before being injected. The equipment used is a "WATERS alliance" chromatography set. The elution solvent is tetrahydrofuran, the flow rate is 0.7 ml/min, the temperature of the system is 35° C. and the analysis duration is 90 min. Use is made of a set of four WATERS "STYRAGEL" columns in series (the trade mark STYRAGEL columns being one "HMW7", one "HMW6E" and two "HT6E"). The injected volume of polymer test specimen solution is 100 μl. The detector is a "WATERS 2410" differential refractometer and the associated software for exploiting the chromatography data is the "WATERS MILLENIUM" system. The calculated mean molecular weights are in relation to a calibration curve produced using polystyrene standards.

The polydispersity index Ip (reminder: Ip=Mw/Mn where Mw is the weight-average molecular weight) of the block elastomer is preferably below 3; more preferably, Ip is below 2.

The block elastomer, extended with polybutene oil, may form the gastight elastomer layer by itself or may alternatively be combined, in this elastomer layer, with other elastomers.

If any other elastomers are used in this composition, the block elastomer constitutes the predominant elastomer in terms of weight: it then preferably represents more than 50%, more preferably more than 70% by weight of the collection of elastomers present in the composition or elastomer layer. Such additional elastomers, which are in the minority in terms of weight, could, for example, be diene elastomers such as natural rubber or synthetic polyisoprene, a butyl rubber or stirene-based thermoplastic elastomers (TPS) other than a block elastomer such as SIBS, within the limit of compatibility between their microstructures.

By way of TPS elastomer other than a block elastomer such as SIBS that can be used to supplement the latter, mention may notably be made of a TPS elastomer chosen from the group consisting of stirene/butadiene/stirene block copolymers, stirene/isoprene/stirene block copolymers, stirene/isoprene/butadiene/stirene block copolymers, stirene/ethylene/butylene/stirene block copolymers, stirene/ethylene/propylene/stirene block copolymers, stirene/ethylene/ethylene/propylene/stirene block copolymers and mixtures of these copolymers. More preferably, the said additional TPS elastomer, if any, is chosen from the group consisting of stirene/ethylene/butylene/stirene block copolymers, stirene/ethylene/propylene/stirene block copolymers and mixtures of these copolymers.

However, according to a preferred embodiment, the block elastomer such as SIBS is the only elastomer, and the only thermoplastic elastomer present in the gastight elastomer composition or layer.

The block elastomers such as SIBS can be used in the way that is conventional for TPEs, by extrusion or moulding, for example starting from a raw material available in the form of beads or granules.

The SIBS elastomers for example are commercially available, sold for example by KANEKA under the trade name "SIBSTAR" (e.g. "Sibstar 102T", "Sibstar 103T" or "Sibstar 073T"). They, together with their synthesis, have been described for example in patent documents EP 731 112, U.S. Pat. No. 4,946,899, U.S. Pat. No. 5,260,383. They were developed initially for biomedical applications and have then been described in various applications specific to TPE elastomers, these being as varied as medical equipment, automotive parts or household electrical components, sheaths for electric wires, sealing components or elastic bands (see, for example, EP 1 431 343, EP 1 561 783, EP 1 566 405, WO 2005/103146).

According to an embodiment of the invention, use is made of polybutene oils, preferably polyisobutylene oils, which have demonstrated the best compromise in properties compared with the other oils tested, notably compared with conventional oils of the paraffin oil type. At ambient temperature (23° C.), these oils, which vary in viscosity, are liquid (that is to say, as a reminder, substances able ultimately to adopt the shape of their container), as opposed to resins or rubbers for example which are, by nature, solid.

By way of examples, polyisobutylene oils are marketed notably by UNIVAR under the trade name "Dynapak Poly" (e.g. "Dynapak Poly 190"), by BASF under the trade names "Glissopal" (e.g. "Glissopal 1000") or "Oppanol" (e.g. "Oppanol B12").

The number-average molecular weight (Mn) of the polybutene oil preferably ranges between 200 and 25 000 g/mol, more preferably still ranges between 300 and 10 000 g/mol. For excessively low Mn values there is a risk that the oil will migrate out of the composition, whereas weights that are too high do not reduce the modulus sufficiently.

The number-average molecular weight (Mn) of the polybutene oil is determined by SEC. The test specimen is dissolved beforehand in tetrahydrofuran at a concentration of about 1 g/l, then the solution is filtered on a porosity 0.45 μm filter before being injected. The equipment used is a "WATERS alliance" chromatography set. The elution solvent is tetrahydrofuran, the flow rate is 1 ml/min, the temperature of the system is 35° C. and the analysis duration is 30 min. Use is made of a set of two "WATERS" columns with the trade name "STYRAGEL HT6E". The injected volume of polymer test specimen solution is 100 μl. The detector is a "WATERS 2410" differential refractometer and the associated software for exploiting the chromatography data is the "WATERS MILLENIUM" system. The calculated mean molecular weights are in relation to a calibration curve produced using polystirene standards.

It is preferable for the polybutene oil content to be above 5 phr, preferably to range between 5 and 100 phr (parts per hundred rubber in total, where "rubber" means the block elastomer such as SIBS plus any other elastomer or TPE that might be present).

Below the indicated minimum, there is a risk that the annular band will exhibit too much rigidity for certain applications whereas beyond the recommended maximum the band is open to a risk of insufficient cohesion of the composition and loss of sealing properties that could prove detrimental depending on the application considered.

For these reasons, it is preferable for the polybutene oil content to be above 10 phr, notably to range between 10 and 90 phr, and more preferably still for it to be above 20 phr, notably ranging between 20 and 80 phr.

The annular band described hereinabove may also contain the various additives customarily present in the airtight layers known to those skilled in the art. Mention may, for example, be made of the reinforcing fillers such as carbon black or silica, non-reinforcing or inert fillers, colorants that can advantageously be used to color the composition, lamellar fillers that further improve the sealing (e.g. phyllosilicates such as kaolin, talc, mica, graphite, clays or modified clays ("organo clays")), plasticizers other than the aforementioned extension oils, protective agents such as antioxidants or antiozonants, anti-UV agents, various workability agents or other stabilizers or alternatively adhesion promoters that encourage adhesion to the remainder of the structure of the tire item.

Aside from the elastomers (block elastomers such as SIBS and any other elastomers that might be present) described hereinabove, the annular band could also contain, still as a minority by weight with respect to the block elastomer, polymers other than elastomers such as, for example, thermoplastic polymers compatible with the block elastomer.

The annular band described hereinabove is a compound that is solid (at 23° C.) and elastic, and which is notably characterized, thanks to its specific formulation, by very high flexibility and very high deformability.

According to one preferred embodiment of the invention, this annular band has a secant tensile modulus, at 10% elongation (denoted M10), which is lower than 2 MPa, more preferably lower than 1.5 MPa (notably below 1 MPa). This parameter is measured in a first elongation (that is to say without an accommodation cycle) at a temperature of 23° C. with a rate of extension of 500 mm/min (in accordance with ASTM D412), and with reference to the initial cross section of the test specimen.

According to one preferred embodiment of the invention, the annular band has a width substantially equal to the curvilinear length in a meridian plane contained between the radially outermost points of each of the flanges.

According to this preferred embodiment of the invention, the annular band can be fitted so that it covers the radially exterior surface of the rim from the radially outermost top of one flange to the top of the other.

Advantageously also according to an embodiment of the invention, the annular band has a diameter substantially equal to the diameter of the rim bottom. The combination of the elastic properties and of the tack which are associated with such a diameter allows the annular band to be fitted in such a way that it correctly covers the radially exterior surface of the rim.

Tests carried out on the device thus produced according to the invention have demonstrated that the annular band is able to provide perfect sealing regardless of the surface finish of the rim onto which it is fitted. Specifically, its properties of airtightness, its flexibility and its low hardness allow a good seal to be achieved in spite of the potential presence of roughnesses on the surface of the rim, the said annular band firmly hugging the surface of the rim.

Furthermore, the sealing device according to an embodiment of the invention is simple to produce. The material of which the annular band is made can be extruded and shaped on a profile section, for example a flat one. The band thus obtained is cut to the desired length and the two ends are welded together using any means known to those skilled in the art, such as thermal and/or chemical means and/or by polymer solution.

One advantageous alternative form of embodiment of the invention provides for the annular band to comprise a second layer of a thermoplastic material radially on the inside of the layer of an elastomeric material comprising at least one copolymer thermoplastic elastomer based on blocks of polystyrene and polyisobutylene and a polybutene oil. This second layer will advantageously act as the rim bottom tape described earlier, and will cover the orifices distributed about the periphery of the rim to allow the tops of the spokes to be attached.

The thermoplastic material is, for example, a polypropylene mixed with a material of the SEBS, SEPS or SEEPS type, in order to obtain adequate deformability.

Advantageously too, the radially interior second layer has a width smaller than the curvilinear length in a meridian plane contained between the radially outermost points of each of the flanges. In such an embodiment, the second layer per-forms a function of protecting the first layer against the orifices in the rim or against the tops of the spokes, and because the radially inner second layer is narrower than the layer of an elastomeric material comprising at least one copolymer thermoplastic elastomer based on blocks of polystirene and polyisobutylene and a polybutene oil, this second layer still allows for ease of fitting onto the rim through the combination of its elastic properties and its tack.

According to this alternative form of the invention, the tape usually positioned in the rim bottom to protect the inner tube from rubbing against the tops of the spokes, the nuts or the edges of the orifices in the rim and which may seem beneficial for protecting, in the case of the invention, the layer of elastomeric material comprising at least one copolymer thermoplastic elastomer based on blocks of polystirene and polyisobutylene and a polybutene oil, is combined with the said layer at the time of its manufacture and can therefore be fitted onto the rim simultaneously. Such an alternative form may therefore be simpler to implement when fitting the sealing device onto the rim if a "protective tape" seems necessary.

Another aspect of the invention is directed to a mounted assembly having a wheel comprising a rim and a tubeless tire, the rim being associated with a sealing device as described hereinabove.

The mounted assembly is advantageously made up of a wheel comprising a rim that is not airtight.

Another aspect of the invention is directed to a method for fitting a sealing device as described hereinabove onto a rim for a wheel designed to accept a tire, the said rim being made up of a rim bottom extended by two flanges, the annular band being stretched out elastically so that it can be positioned over the radially outermost points of each of the flanges.

As explained hereinabove, the elastic properties make it possible to increase the diameter of the band which can then be fitted easily resting against the radially outermost points of each of the flanges and the tack of the said band allows it to revert partially to its initial size while its edges remain held by friction against the flanges of the rim. Furthermore, the relatively high hysteresis of the annular band ensures that it reverts to its initial size relatively slowly allowing the annular band to be correctly positioned in relation to the rim bottom and notably allowing the correct centering.

BRIEF DESCRIPTION OF THE SINGLE DRAWING

Other details and advantageous features of the invention will emerge hereinafter from the description of one exemplary embodiment of the invention given with reference to the FIGURE which is a diagrammatic radial cross section of a design of a rim according to the invention.

DETAILED DESCRIPTION OF THE SINGLE DRAWING

For ease of understanding, the FIGURE is not drawn to scale.

The FIGURE schematically depicts a radial cross section of a rim 1 for a bicycle. The rim 1 notably comprises a rim bottom 2 extended laterally by two flanges 3. The radially outer ends of the flanges 3 also have gutters 4.

The rim bottom 2 covers a cavity 5 through which the tops of the spokes 6 pass so that they can be attached to the rim 1. The rim bottom also, as explained previously, has orifices 7 providing access to the tightening nuts 8 used to attach the tops of the spokes.

A tape such as a band of thermoplastic or a layer of textile reinforcement 9 is laid in the rim bottom 2 to protect the sealing device according to the invention, which will notably cover the rim bottom 2 comprising the orifices 7 against which the annular band 10 that constitutes the sealing device could rub and become damaged notably as it is being fitted. As explained previously, such a textile reinforcing layer is already known for protecting the inner tube in a mounted assembly consisting of a rim, a tire and an inner tube.

The annular band 10 that forms the sealing device covers the surface of the rim bottom 2 and extends on either side onto the surface of each of the mutually-facing flanges 3, substantially as far as each of the gutters 4.

The annular band 10 according to the invention consists of an SIBS block elastomer ("Sibstar 102T" with a stirene content of around 15%, a Tg of around −65° C. and an Mn of about 90 000 g/mol) extended with around 66 phr of PIB oil ("Dynapak Poly 190" with an Mn of the order of 1000 g/mol).

The annular band is obtained by extrusion and is then laid on an interleaf. The band thus obtained is cut to the desired length and the two ends are thermally welded to form an annulus.

The properties of the annular band 10 thus obtained will allow it to be fitted simply and accurately. Specifically, its elastic properties and hysteresis allow it to be stretched, positioned accurately, and to take up its position on the rim bottom 2 accurately. Its composition effectively makes it easy to deform and its return to its initial state is sufficiently slow that it can be positioned accurately before this return occurs. The annular band 10 is thus laid and centered on the rim 1, resting against the top of the gutters 4. The annular band 10 also has a sticky surface finish which allows it, as it returns to its initial state, to remain in contact with the flanges 3 because of the friction generated between the annular band 10 and the surface of the flanges 3; ultimately, as can be seen in the FIGURE, the annular band extends from one flange to the other, covering part of the surfaces of these flanges and covering the surface of the rim bottom 2.

The properties in terms of rigidity also enable the bands to absorb all irregularities on the surface of the rim 1 and thus lead to complete sealing without any of the microleaks that might have arisen using existing devices as recalled earlier.

Once the sealing device has been combined with the rim 1, it is then possible to mount a "tubeless" tire on the rim. Because the annular band has a sticky surface finish or "tack", it is preferable, in order to make the tire easier to mount, to make the surface of the annular band 10 on which the tire is to slide in order to be mounted more slippery. This slipperiness can, for example, be achieved by dusting with talc prior to the step of mounting the tire.

Another solution may, when producing the annular band, be to co-extrude with it another material that does not have a sticky surface finish and is intended to form the radially exterior surface of the annular band 10 once it has been mounted on the rim 1. This may, for example, be a composition based on polyethylene, polypropylene, that has no influence over the deformability properties of the band.

Another conceivable, more complex way of producing the device would be to use co-extrusion to manufacture a three-layer device comprising a central layer corresponding to the annular band described hereinabove, a radially exterior layer made using a material that has a non-sticky surface finish, and a radially interior layer of a thermoplastic material that affords a function of protecting the first layer against the orifices in the rim or against the tops of the spokes. The radially interior layer is then preferably axially narrower than the other layers so that the sticky surface finish of the central layer allows the device, once it returns to its initial state during mounting on the rim, to remain in contact with the flanges of the rim as a result of the friction generated between the said central layer and the surface of the flanges.

Because the annular band 10 covers the surface of the bottom of the rim 2 in order to seal the said rim 2, it is also necessary to provide a valve that is to pass through the bottom of the rim 2 and through the annular band 10 to allow the mounted assembly to be inflated. This valve may advantageously be associated with the annular band 10 at the time of manufacture thereof. Notably, it may be secured by welding when the band is actually being created by welding together the two ends of the band obtained after the extruded profile section has been cut to length.

Mounting and running tests have been carried out on this type of mounted assembly on a mountain bike 47-559 tire on a 559 rim using "tubeless" technology.

Mounting the sealing device proved simple to do and the addition of talc to the annular band once in position on the rim made the mounting of the tire consistent with normal practice.

The mounted assembly was then inflated to 3 bar and kept stationary for 15 days. The pressure measured at the end of this period had not changed significantly.

Road and off-road riding tests did not reveal any significant deficiency of the mounted assembly thus produced according to the invention either.

The invention claimed is:

1. A sealing device forming an annular band adapted to be associated with a rim for a wheel configured to accept a tire, said rim having a rim bottom and two flanges extending therefrom, the device being adapted to be housed in the bottom of said rim and fitted in such a way as to lie on at least the rim bottom, wherein said annular band comprises at least one layer of an elastomeric material comprising at least one copolymer thermoplastic elastomer containing blocks of polystyrene and polyisobutylene, and a polybutene oil.

2. The device according to claim 1, wherein said at least one block copolymer is a stirene/isobutylene/stirene copolymer ("SIBS").

3. The device according to claim 1, wherein said at least one block copolymer contains between 5 and 50% stirene by weight.

4. The device according to claim 1, wherein a glass transition temperature (Tg) of said at least one block copolymer is below −20° C.

5. The device according to claim 1, wherein a number-average molecular weight (Mn) of said at least one block copolymer is between 30 000 and 500 000 g/mol.

6. The device according to claim 1, wherein said polybutene oil includes a polyisobutylene oil.

7. The device according to claim 1, wherein a number-average molecular weight (Mn) of said polybutene oil is between 200 and 25 000 g/mol.

8. The device according to claim 1, wherein said polybutene oil content is in a range between 5 and 100 parts per hundred rubber (phr).

9. The device according to claim 1, wherein said annular band has a width substantially equal to a curvilinear length in a meridian plane contained between radially outermost points of each of said two flanges.

10. The device according to claim 1, wherein said annular band has a diameter substantially equal to a diameter of said rim bottom.

11. The device according to claim 1, wherein said annular band comprises a second layer of a thermoplastic material radially on an inside of said layer of an elastomeric material comprising at least one copolymer thermoplastic elastomer based on blocks of polystirene and of polyisobutylene, and a polybutene oil.

12. The device according to claim 11, wherein said radially interior second layer has a width smaller than a curvilinear length in a meridian plane contained between radially outermost points of each of said two flanges.

13. A mounted assembly having a wheel comprising a rim and a tubeless tire, said rim being associated with the sealing device of claim 1.

14. The mounted assembly according to claim 13, further comprising a wheel comprising a rim that is not airtight.

15. A method of fitting the sealing device of claim 1 on a rim for a wheel configured to accept a tire, said rim having a rim bottom and two flanges extending therefrom, wherein said annular band is stretched elastically and is positioned over radially outermost points of each of said two flanges.

* * * * *